(12) United States Patent
Rabe et al.

(10) Patent No.: US 9,558,445 B1
(45) Date of Patent: Jan. 31, 2017

(54) INPUT VALIDATION TECHNIQUES

(71) Applicants: Bruce R. Rabe, Dedham, MA (US);
Scott E. Joyce, Foxboro, MA (US);
Norman M. Miles, Bedford, MA (US);
Peter Chen, Charlton, MA (US)

(72) Inventors: Bruce R. Rabe, Dedham, MA (US);
Scott E. Joyce, Foxboro, MA (US);
Norman M. Miles, Bedford, MA (US);
Peter Chen, Charlton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 371 days.

(21) Appl. No.: 13/626,272

(22) Filed: Sep. 25, 2012

(51) Int. Cl.
G06N 5/02 (2006.01)

(52) U.S. Cl.
CPC .............. G06N 5/02 (2013.01); G06N 5/025 (2013.01)

(58) Field of Classification Search
None
See application file for complete search history.

(56) References Cited

U.S. PATENT DOCUMENTS

| 6,182,220 | B1* | 1/2001 | Chen et al. ................... 713/182 |
| 7,596,223 | B1* | 9/2009 | Vogel, III ..................... 380/270 |
| 8,176,324 | B1* | 5/2012 | Krishnamurthy ............. 713/168 |
| 8,396,927 | B2* | 3/2013 | Cai et al. ...................... 709/206 |
| 2004/0073747 | A1* | 4/2004 | Lu ................................ 711/114 |
| 2004/0230547 | A1* | 11/2004 | Wookey et al. ................ 706/47 |
| 2008/0005127 | A1* | 1/2008 | Schneider ......... H04L 29/12594 |
| 2010/0125450 | A1* | 5/2010 | Michaelangelo et al. ........ 704/9 |
| 2010/0251092 | A1* | 9/2010 | Sun ....................... G06F 17/243 715/222 |
| 2010/0281355 | A1* | 11/2010 | White et al. .................. 715/222 |
| 2011/0078405 | A1* | 3/2011 | Asano .................. G06F 3/0607 711/170 |
| 2011/0231322 | A1* | 9/2011 | Meyer ........................... 705/310 |
| 2012/0254090 | A1* | 10/2012 | Burris et al. .................... 706/47 |
| 2012/0304275 | A1* | 11/2012 | Ji et al. ........................... 726/11 |

OTHER PUBLICATIONS

"Running several rule engines in parallel", in IBM Operational Decision Manager 8.0.0 manual, IBM Corporation 1987, 2012.*
Chen et al, "Security enhancement for a three-party encrypted key exchange protocol against undetectable on-line password guessing attacks", Computer Standards & Interfaces 30 (2008), pp. 95-99.*

* cited by examiner

Primary Examiner — Stanley K Hill
Assistant Examiner — Ilya Traktovenko
(74) Attorney, Agent, or Firm — Muirhead and Saturnelli, LLC

(57) ABSTRACT

Described are techniques for processing inputs. A plurality of rules engines is provided. Each of the rules engines is written in a different programming language. Input validation processing is performed of a first set of one or more inputs by a first of the plurality of rules engines using a first portion of a set of validation rules. Input validation processing is performed for the first set of one or more inputs by a second of the plurality of rules engines using the first portion of validation rules.

18 Claims, 11 Drawing Sheets

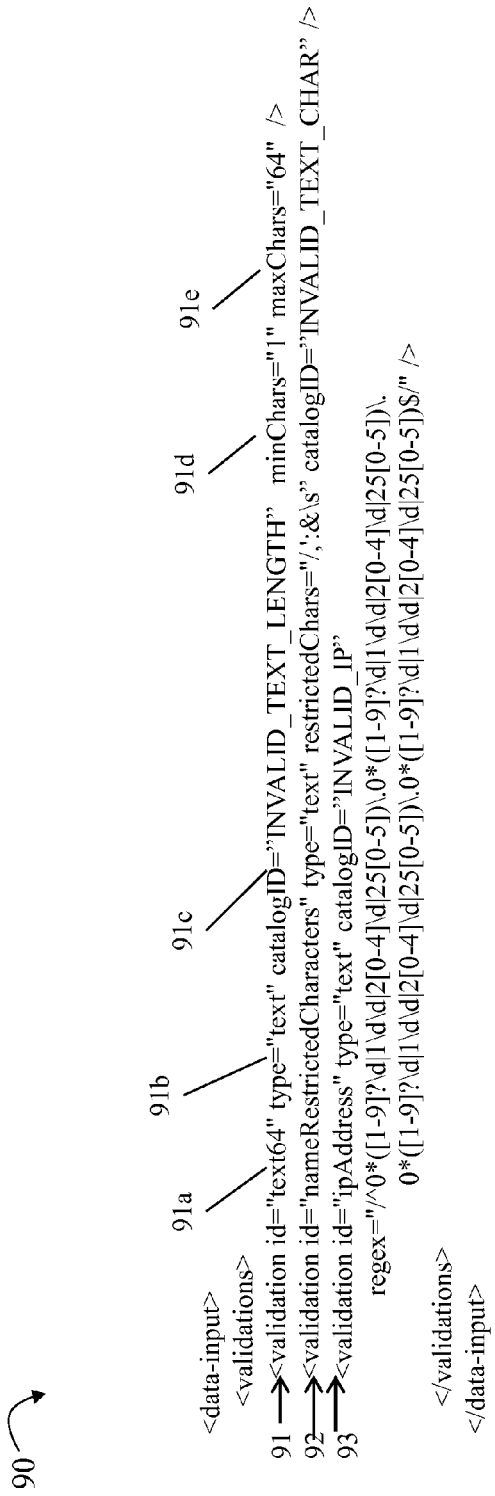

```
<data-input>
  <validations>
    <validation id="text64" type="text" catalogID="INVALID_TEXT_LENGTH" minChars="1" maxChars="64" />
    <validation id="nameRestrictedCharacters" type="text" restrictedChars="/';:&\s" catalogID="INVALID_TEXT_CHAR" />
    <validation id="ipAddress" type="text" catalogID="INVALID_IP"
      regex="/^0*([1-9]?\d|\d\d|2[0-4]\d|25[0-5])\.0*([1-9]?\d|\d\d|2[0-4]\d|25[0-5])\.
             0*([1-9]?\d|\d\d|2[0-4]\d|25[0-5])\.0*([1-9]?\d|\d\d|2[0-4]\d|25[0-5])$/" />
  </validations>
</data-input>
```

FIGURE 2C

INPUT VALIDATION TECHNIQUES

BACKGROUND

Technical Field

This application relates to techniques used in connection with input validation techniques.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software, may be used in connection with management of data storage systems. The management software, as well as more generally any software, may obtain inputs used in connection with performing an operation or task. For example, user inputs may be obtained using a user interface.

SUMMARY OF THE INVENTION

In accordance with one aspect of the invention is a method for processing inputs comprising: providing a plurality of rules engines, wherein each of the plurality of rules engines is written in a different programming language; performing input validation processing of a first set of one or more inputs by a first of the plurality of rules engines using a first portion of a set of validation rules; and performing input validation processing of the first set of one or more inputs by a second of the plurality of rules engines using the first portion of validation rules. The method may also include transforming at least one of the first set of one or more inputs and producing a second set of one or more inputs as a result of said transforming; and performing input validation processing of the second set of one or more inputs by the second rules engine using a second portion of the set of validation rules, whereby the second portion of the validation rules and the first portion of the validation rules each include at least one same rule from the set of validation rules. Each of the validation rules may be uniquely identified by a rule identifier. Each validation rule may include validation criteria and may identify a message identifier associated with an error message included in a message catalogue. The error message may be displayed responsive to one of the plurality of rules engines determining, for an input, that said validation criteria of said each rule is not met by said input. The message identifier may be an index into the message catalogue and a record of the message catalogue identified by the index may include the error message. The message catalogue may be one of a plurality of message catalogues. Each of the plurality of message catalogues may include text of error messages in a different language. The index may identify a record in each of the plurality of message catalogues including the error message in a different language. One of the plurality of message catalogues may be selected for use in accordance with a language setting. The first rules engine may perform input validation processing for a selected input at runtime during execution of a first code module, and the first code module may issue a request to said first rules engine to perform input validation processing for the selected input. Upon successful validation of the selected input, the first code module may transform the selected input into a second input and may issue a request to a second code module in accordance with an application programming interface defined for invoking the second code module. The application programming interface may include one or more parameters whereby the second input may be specified as a value for a first of the one or more parameters. The second code module may perform input validation processing of the second input using another one of the plurality of rules engines. The validation criteria may include one or more elements of required criteria. At least one of the validation rules in the set may include one or more element of optional criteria. Input validation processing of the first set of one or more inputs may use a first validation rule of the set of validation rules. The first validation rule may include first required criteria and first optional criteria. The first set of one or more inputs may be determined as valid if each input in the first set meets the first required criteria and the first optional criteria. The first portion of validation rules may be used to perform any of ensure that an input is a valid IP address, ensure that a number of physical devices specified is allowable for a particular selected RAID type, ensure that a string input has a length in a defined range, and ensure that a string input does not include a restricted character.

In accordance with another aspect of the invention is a computer readable medium comprising code stored thereon for processing inputs, the computer readable medium comprising code for: providing a plurality of rules engines, wherein each of the plurality of rules engines is written in a different programming language; performing input validation processing of a first set of one or more inputs by a first of the plurality of rules engines using a first portion of a set of validation rules; and performing input validation processing of the first set of one or more inputs by a second of the plurality of rules engines using the first portion of validation rules. The computer readable medium may further comprise code for transforming at least one of the first set of one or more inputs and producing a second set of one or more inputs as a result of said transforming; and performing input validation processing of the second set of one or more inputs by the second rules engine using a second portion of the set of validation rules, whereby the second portion of the validation rules and the first portion of the validation rules each include at least one same rule from the set of validation rules. Each of the validation rules may be uniquely identified by a rule identifier. Each validation rule may include validation criteria and may identify a message identifier associated with an error message included in a message catalogue. The error message may be displayed responsive to one of the plurality of rules engines determining, for an input, that the validation criteria of said each rule is not met by the input.

In accordance with another aspect of the invention is a system comprising: a first set of one or more clients, wherein each client in said first set uses one of a plurality of rules engines to perform input validation of inputs received at said each client, wherein each of the plurality of rules engines is written in a different programming language and performs input validation processing using validation rules used by every other one of the plurality of rules engines; and a second set of one or more servers, wherein each server in said second set uses one of the plurality of rules engines to perform input validation of inputs received at said each server, wherein each of the plurality of rules engines uses a set of one or more message catalogues from which a message is obtained in response to determining an input is invalid, each of the one or more message catalogues including message text in a different language or language dialect, and wherein each of the validation rules includes validation criteria used to determine whether an input is valid, the criteria including required validation criteria and optionally including optional validation criteria.

BRIEF DESCRIPTION OF THE DRAWINGS

Features and advantages of the present invention will become more apparent from the following detailed description of exemplary embodiments thereof taken in conjunction with the accompanying drawings in which:

FIG. 2C is an example illustrating validation rules specified in XML format that may be used in an embodiment in accordance with techniques herein;

DETAILED DESCRIPTION OF EMBODIMENT(S)

Figure 1:
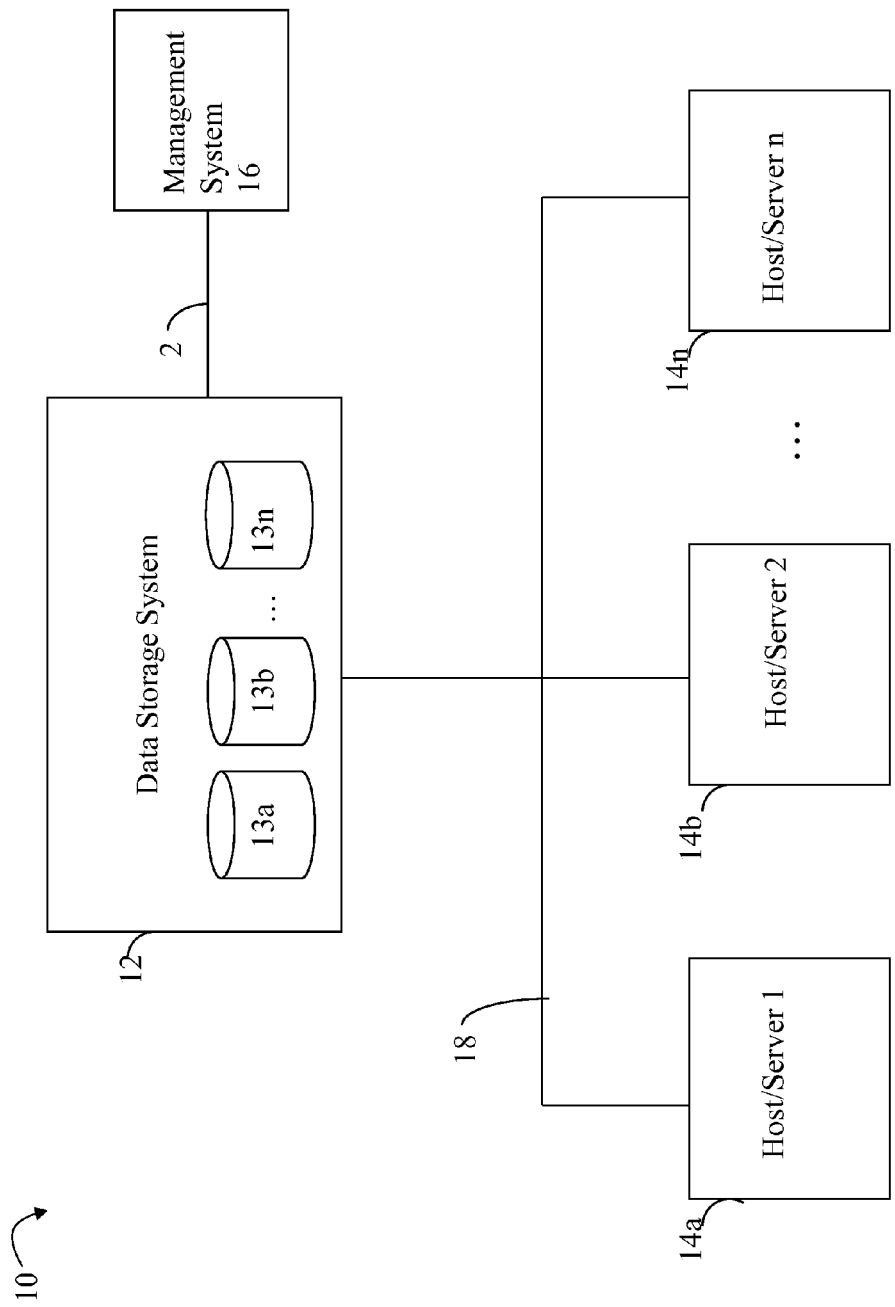
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
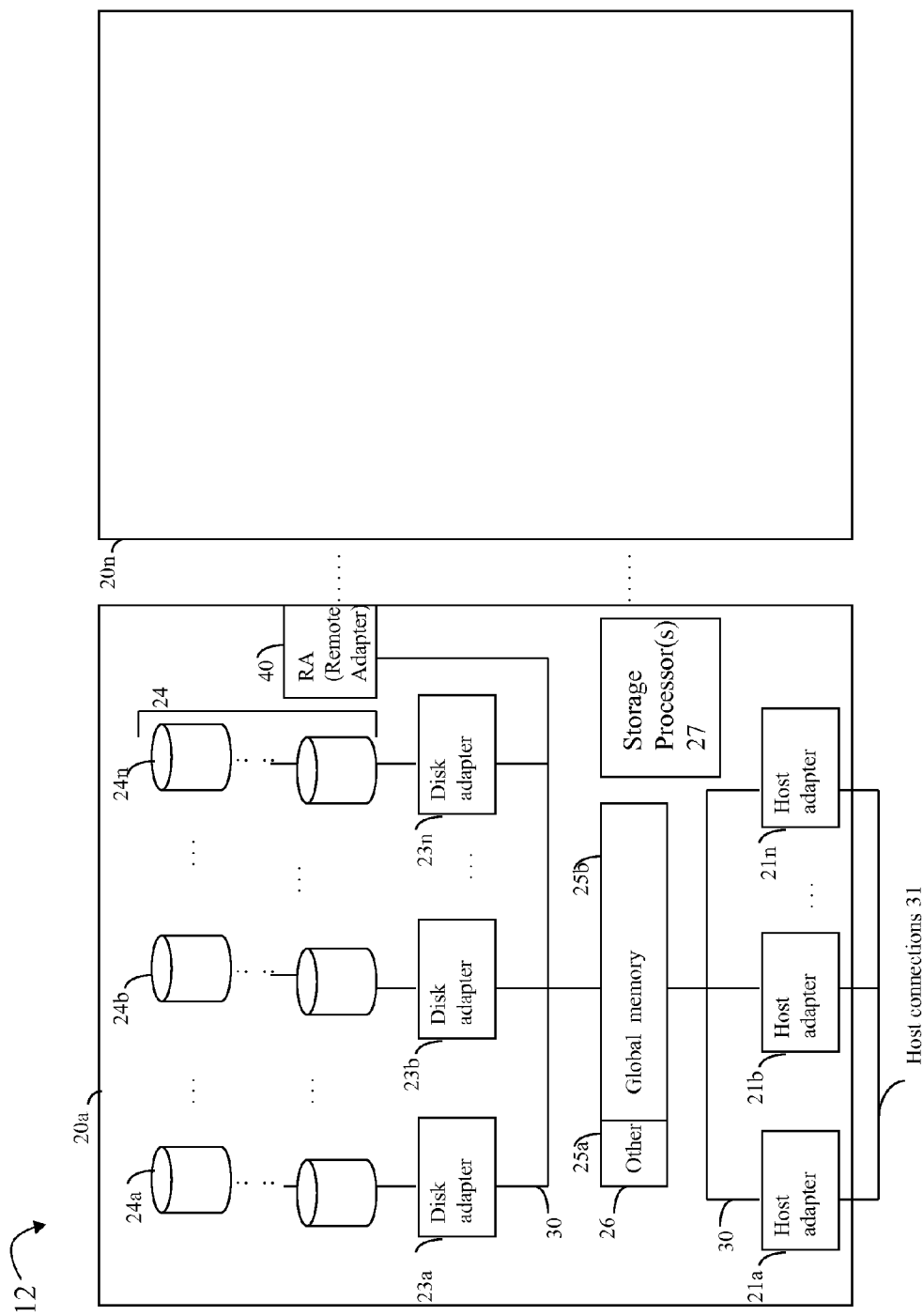
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array interconnected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Management software may execute on the data storage system and/or management system. A client, such as a user interface (UI) included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

In connection with the data storage management configuration software, or more generally, any software, various user inputs may be obtained in connection with performing a requested operation. For example, a user may select an operation in connection with data storage management and may provide additional inputs using the GUI in connection with performing the requested operation.

What will now be described are techniques that may be used in connection with validating input, such as use input entered using a GUI, CLI (command line interface) or other UI. The techniques herein may be used by clients and/or servers in connection with validating input such as prior to performing and operation to ensure that the obtained user input is valid. The determination of validity of user input may be made in accordance with a set of one or more validation rules. The validation rules may be a set of common rules used by one or more different software modules or components written in any programming language. In this manner, the set of rules may be used by multiple software components. The multiple components or software modules may use the same set of rules or may otherwise each store a copy of the same set of rules whereby the multiple components operate using the same rules although there may be multiple copies or replicates of the set. The multiple components may each be written in a different programming language such as, for example, Javascript, Java, Objective C, C++, and the like. Each component may include, or otherwise utilize, a rules validation engine (also referred to as rules engine or engine elsewhere herein) that may interpret the rules, such as by performing a runtime interpretation of the rules when code of the component is executing. Each component may invoke a rules validation engine to validate inputs prior to performing an operation or other processing using the inputs. In this manner, the same version or set of rules may be written and coded once and used in connection with performing input validation by multiple software modules or components whereby such components may include clients and/or servers. As will be described in more detail below, a validation rule may be uniquely identified from other rules by a rule identifier. Each validation rule may also include one or more required elements and may include one or more optional elements. A validation rule may include required elements such as, for example, required validation criteria and an index into a message catalogue. A validation rule may also include optional elements, such as one or more optional validation criteria. The index, or more generally message identifier (ID), for a particular validation rule may be associated with the text of an error message included in the catalogue whereby the text may be displayed if input does not meet the validation criteria of the particular validation rule. The text of error messages may be partitioned or physically maintained separately from the validation rules and components. In this manner, an embodiment may use multiple message catalogues each of which may include text for the error messages based on the spoken languages of different localities or geographic areas. For example, an embodiment may use multiple catalogues including a first catalogue with messages in English, a second catalogue with messages in French, and the like. The multiple catalogues may use the same set of indices or message IDs where the same index in each of the multiple catalogues is associated with text of the same error message in a different spoken or written language. A particular one of the catalogues may be selected as active or used based on a currently selected language setting (e.g., such as may be specified manually, in a configuration file, and the like).

Figure 2A:
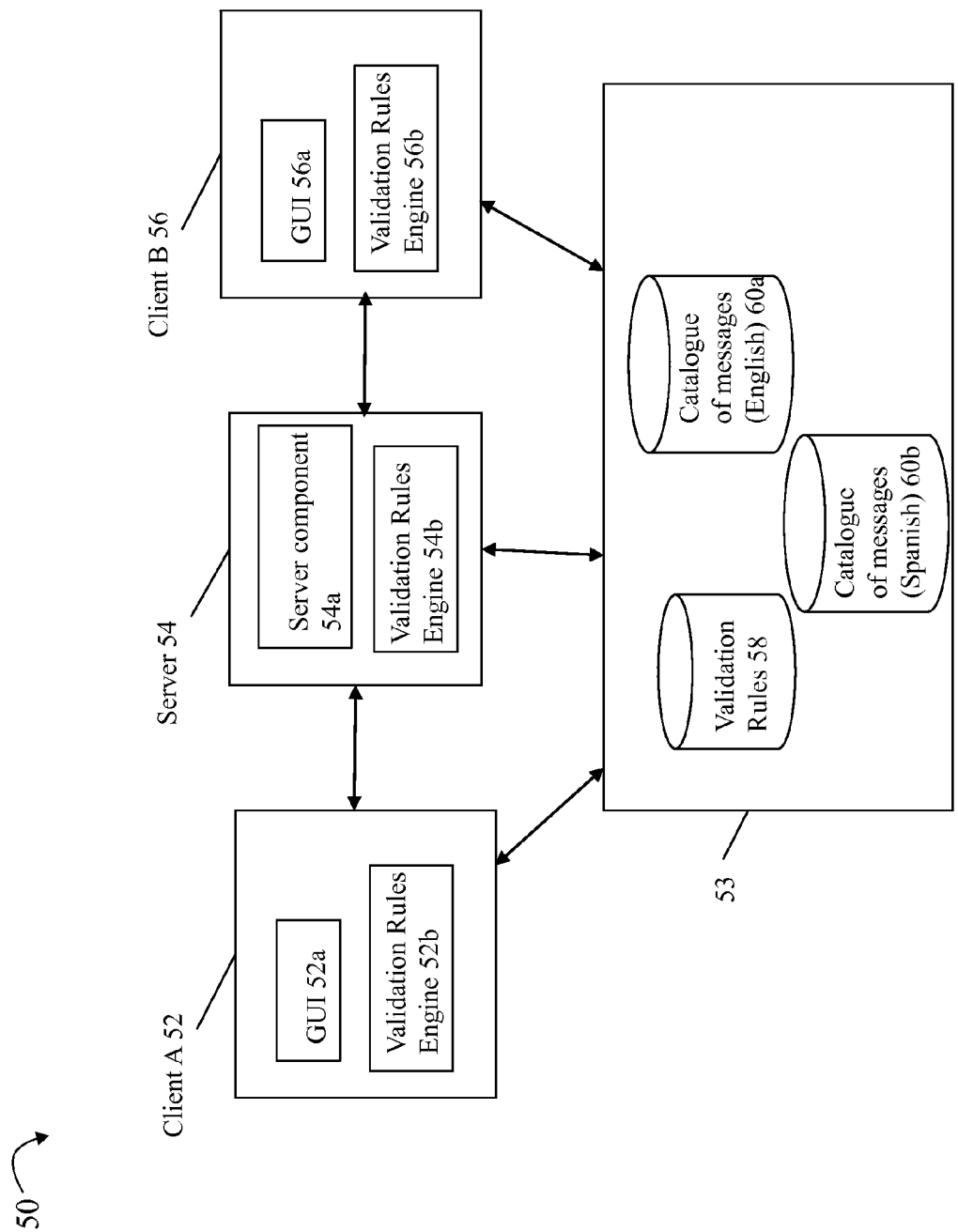
FIGS. 2A, 3 and 7 are examples illustrating data flow and communications between components in embodiments in accordance with techniques herein.

Referring to FIG. 2A, shown is an example 50 including clients 52, 56, server 54, validation rules 58, and catalogues of messages 60a, 60b. The rules 58 and catalogues 60a, 60b may be stored in a database or one or more other data containers 53 commonly accessible for use by the components including the clients 52, 56 and server 54. It should be noted that although in this example and others herein there may be a particular number of components (such as 3 here) which use the same rules 58 and catalogues 60a, 60b, more generally any number of components, any number of clients, any number of servers, and the like, may use the same rules 58 and catalogues 60a, 60b. Additionally, in this example the components 52, 54 and 56 may use the same copy of the rules 58 and catalogues 60a, 60b. However, as a variation, the components may use a replicate of the rules and/or catalogues 60a, 60b whereby each replicate is a copy of the same version or set of rules. In this manner, all such components may operate using the same version or set of rules. It should be noted that catalogue 60a may include text for messages in a first language such as English and catalogue 60b may include text for the same messages in a second different language such as Spanish.

Each of the components 52, 54 and 56 may be written in a different programming language. Element 52 may represent one or more software modules or components of client A and may include a GUI 52a and a validation rules engine 52b. Element 56 may represent one or more software modules or components of client B and may include a GUI 56a and a validation rules engine 56b. Element 54 may represent one or more software modules or components of the server and may include a server component 54a (which performs processing to service requests from clients 52, 56) and a validation rules engine 54b. Each such component 52, 54, 56 may invoke a respective validation rules engine 52b, 54b, 56c to validate inputs. Each of the rules engines 52b, 54*b*, 56*b* may be written in the same language as the respective one of the components 52*a*, 54*a*, 54*b* invoking the rules engine instance.

In the example 50, client A 52 includes the GUI 52*a* used to obtain user input for performing an operation or request. The user input may include, for example, parameters used in connection with performing the operation or request. The client A 52 may perform processing to validate the user inputs, such as obtained through the GUI. The client A 52 may invoke the validation rules engine 52*b* in connection with validating the user inputs prior to sending a request to the server 54 to perform the requested operation. If the inputs are determined as valid, the request, including user inputs specified as parameters, may be transmitted from the client A 52 to the server 54. The request from client A 52 to server 54 may be made in accordance with a defined interface, such as an application programming interface (API), used by clients 52, 56, to request services of the server 54. As known in the art, the API may include a defined method or routine name and any parameters of appropriate types. The GUI 56*a* and rules engine 56*b* of client B 56 may operate in a manner similar to the GUI 52*a* and rules engine 52*a* of client A. The server 54 may receive the request and associated one or more inputs from a client, such as client A 52 or client B 56 and may also perform processing to validate the inputs received in the request. The server component 54*a* may, for example, perform processing to service the request from client A. Such processing may include initially validating the inputs received from client A by invoking the validation rules engine 54*b* to perform the server input validation. The rules engine 54*b* may operate in a manner similar to engines 52*b* and 56*b* in validating inputs.

The validation rules engine 52*b*, 54*b* and 56*b* may use the validation rules 58 to perform data validation of the requested inputs. For example, a user input may be obtained from the GUI 52*a* which is expected to include an integer within a specified integer range, such as greater than 0. The validation criteria of having the input be an integer which is greater than 0 may be specified in one or more validation rules 58. At runtime after the input is received, the GUI 52*a* may invoke the validation rules engine 52*b* to perform the particular desired validation by specifying the one or more relevant validation rules of 58 including the desired validation criteria. The engine 52*b* may return a value to the GUI 52*a* indicating whether the input meets the validation criteria. If the input meets the validation criteria, processing may continue as noted above with the request being sent from the client A 52 to the server 54. Otherwise, an appropriate error message may be displayed by the GUI 52*a*. In this embodiment, each validation rule may identify an index or message ID associated with an appropriate error message displayed if input does not meet criteria of the validation rule. As described elsewhere herein in more detail, the index or message ID may uniquely identify a particular text message or string in each of the catalogues 60*a*, 60*b*. The GUI 52*a* may use information such as configuration data identifying which of the catalogues 60*a* or 60*b* is to be used such as based on the selected language or geographic locality of the user providing the inputs. In this manner, the GUI 52*a* may use the same index or message ID of a validation rule to obtain text of an error message in English from catalogue 60*a* or text for the error message in Spanish from catalogue 60*b*.

Generally, the client A 52 may receive first inputs (such as using the GUI 52*a*) which may be validated using engine 52*b* and rules 58. The first inputs may be included in a suitable from in accordance with issuing the request with parameters having values specified by the first inputs whereby the request and parameters may be sent to the server 54. The first inputs may be further transformed into second inputs based on the particular API of the server 54. For example, a first input may be an integer. The API used to issue the request to the server may require that the first input be transformed from an integer type to a character string including the integer value specified as a character or string data type. As another example, the first input may be an integer value denoting a menu selection associated with a physical device or drive type such as an FC 15K RPM rotating disk drive, an FC 10K RPM rotating disk drive, a solid state drive (SSD) such as a flash-based drive, and the like. The integer value may be mapped to a character string denoting the appropriate drive type whereby the API may use a set of predefined character strings for the recognized allowable drive types (e.g., "FC_10K" for the FC 10K RPM rotating disk drive, "FC_15K" for the FC 15K RPM rotating disk drive, and "EFD" or "FLASH" for the SSD). In this manner, the server 54 may perform its own independent validation of inputs received from clients to ensure that the inputs meet necessary validation criteria of the server 54. The clients 52, 56 and server 54 may use the same validation rules 58 and catalogues 60*a*, 60*b* in connection with performing any input validation processing.

As described above, an embodiment in connection with FIG. 2A may have clients 52, 56 obtain copies of the message catalogues 60*a*, 60*b* as may be used in connection with a particularly selected language (e.g. such as for a particular locality). In this embodiment, the client may perform the processing to obtain the appropriate catalogue(s) and read/index into the catalogue to obtain any needed message text. As an alternative, an embodiment may utilize an API (application programming interface) between the client and the server whereby the client includes information in the API call for the request to the server to perform a requested operation. Additionally, the API may include information to identify the selected language (e.g., or otherwise denote a locality or other information from which a language may be determined). In this latter case, the server may perform the processing for localization of error message text rather than the client. For example, the server (rather than the client) may obtain the message catalogues and retrieve any necessary message(s) from the appropriate catalogue based on the selected language as indicated in the API parameters from the client. The server may include the error message text as a return parameter to the client as may be needed upon the occurrence of invalid data.

Aspects of elements of FIG. 2A used in accordance with techniques herein will now be described in more detail.

Figure 2B:
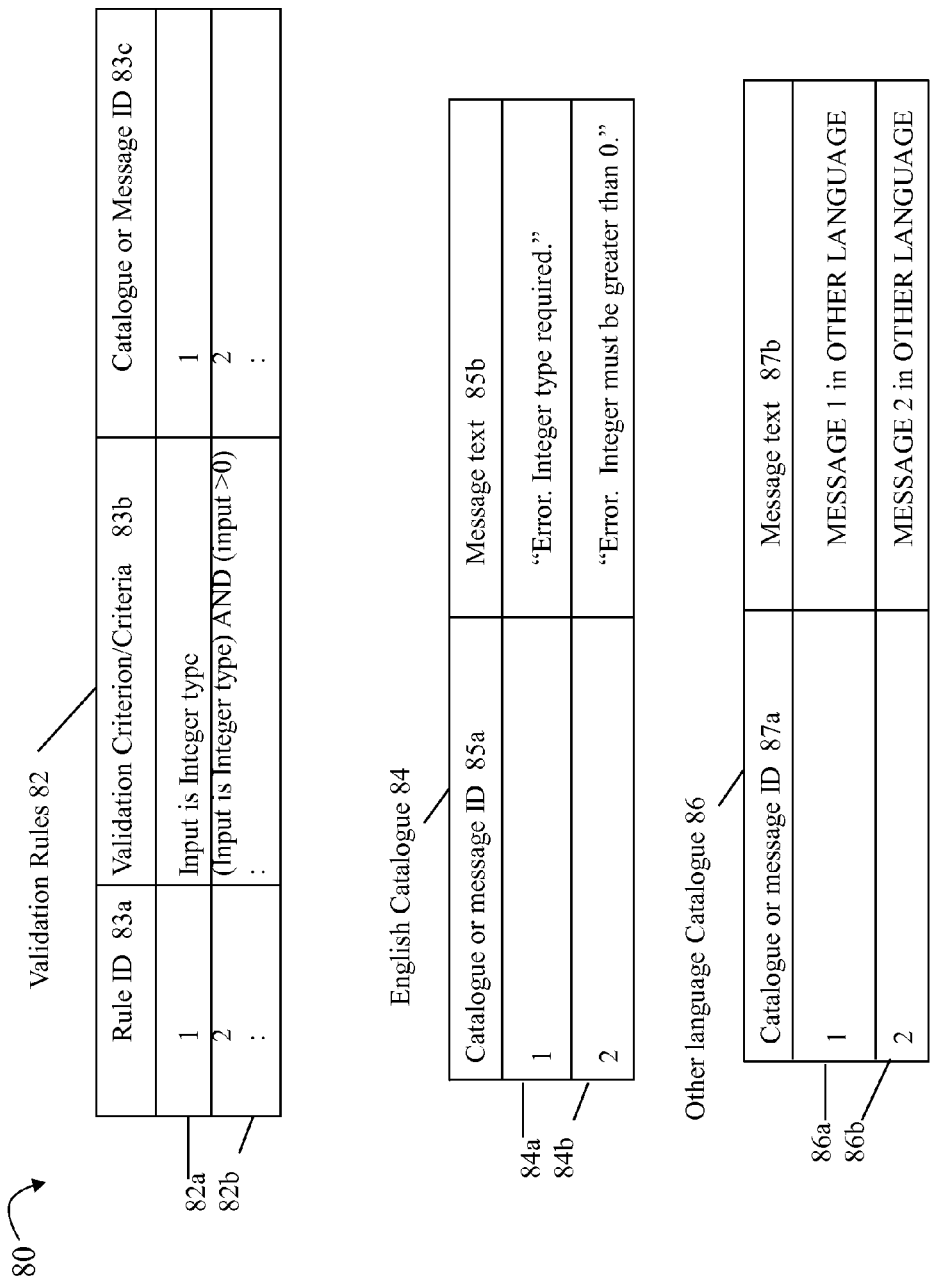
FIG. 2B is an example illustrating validation rules and message catalogues that may be used in an embodiment in accordance with techniques herein.

Referring to FIG. 2B, shown is an example 80 illustrating validation rules 82 and catalogues 84, 86 in more detail. As described above, each of the validation rules 82 may have a general format including a rule ID 83*a*, validation criteria 83*b*, and a catalogue or message ID 83*c*. Each row of 82 may represent information for a single validation rule. Row 82*a* may include a rule ID=1 (uniquely identifying the rule of row 82*a* from other rules 82), validation criteria specifying that the input being validated be of type integer, and a message ID=1. If rule ID=1 is specified and the input does not meet the validation criteria (e.g., is not of type integer), an error message may be displayed having text associated with message ID=1. In this example, the message ID=1 may be used to index into an appropriate one of the catalogues 84, 86 to retrieve message text for a particular language. Catalogue 84 may include a row or line for each English error message. Each row may include a catalogue or message ID

85*a* and message text 85*b*. Row 84*a* includes message text associated with the message ID=1. Row 84*b* includes message text associated with the message ID=2. Similarly, catalogue 86 may include a row or line for each error message in a language other than English, such as Spanish. Each row of 86 may include a catalogue or message ID 87*a* and message text 87*b*. Row 86*a* includes message text associated with the message ID=1. Row 86*b* includes message text associated with the message ID=2. Thus, for example, if the language selected is English and the input does not meet the validation criteria of rule 82*a*, message text in column 85*b* of row 84*a* may be retrieved and displayed to the user. If the language selected is another language other than English and the input does not meet the validation criteria of rule 82*a*, message text in column 86*b* of row 86*a* may be retrieved and displayed to the user.

With reference back to validation rules 82, row 82*b* may specify information for a second validation rule when validating input required to be of type integer and additionally have a value that is greater than 0. The row 82*b* may include rule ID=2, specify validation criteria that, for the input to valid, the input is of type integer and has a value that is greater than 0, and may identify message ID=2. If the input being validated in accordance with the criteria of the rule 82*b* does not meet the criteria, the message text in either of rows 84*b* or 86*b* may be retrieved and displayed depending on the selected language or locality as described above.

As a further illustration, reference is made to FIG. 2C where an example of validation rules is provided where the rules are defined using XML (extended markup language) known in the art. Elements 91, 92 and 93 denote information for 3 different validation rules. In this example, each rule may include a set of XML tags which define various aspects of the input validation to be performed when that particular rule is selected. Each validation rule 91, 92 and 93 may include the following set of required XML tags:

Id—uniquely identifies the validation (e.g., corresponds to 83*a* of FIG. 2B);

type—defines the data type associated with the validation (e.g., corresponds to required validation criteria included in 83*b* of FIG. 2B); and catalogID—used to look up user friendly/localized text to generate the error message (e.g., corresponds to 83*c* of FIG. 2B).

In this example, it should be noted that each "Id" used to uniquely identify the validation may be a text or character string rather than an integer value. As a further variation, each text or character string may also identify a corresponding integer value uniquely identifying a rule. In this case, the text or character string may, for example, be included in an enumerated type. As known in the art of computer programming, an enumerated type may be a data type supported by certain programming languages. Generally, a set of names or identifiers may be specified for the enumerated type where each instance of a name or identifier may be associated with a different integer value from others included in the set. For example, the colors RED, BLUE and GREEN may denote 3 identifiers of an enumerated type set where RED (the first element in the set) may be associated with 1, BLUE (the second element in the set) may be associated with 2, and GREEN (the third element in the set) may be associated with 3. Each of the 3 names in the set of colors may denote an integer value as described serving as the message ID or index into the catalogue.

Additionally, besides required validation criteria of type, a rule may include optional validation criteria specified using one or more optional XML tags. Examples of optional operation tags used to specified optional validation criteria may include:

minChars, maxChars—define the minimum and maximum lengths of the input data (see rule 91 of FIG. 2C);

restrictedChar—limits the set of allowed characters (see rule 92 of FIG. 2C); and regex—specifies the regular expression which must match to true for the input to be valid (see rule 93 of FIG. 2C).

Rule 91 specifies input validation criteria that an input be of type text or string and have a length between 1 and 64, inclusively. Rule 92 specifies input validation criteria that an input be of type text or string and not include any characters specified in restrictedChars (e.g., a valid input does not include any of the following characters: "/,':&\s". Rule 93 specifies input validation criteria that an input be of type text or string and have a pattern or format in accordance with the regular expression denoted by regex="/^0*([1-9]?\d|1\d\d|2[0-4]\d|25[0-5])\.0*([1-9]?\d|1\d\d|2[0-4]\d|25[0-5])\.0*([1-9]?\d|1\d\d|2[0-4]\d|25[0-5])\.0*([1-9]?\d|1\d\d|2[0-4]\d|25[0-5])$/".

As known in the art, a regular expression is an expression using formal notation or syntax that may be used to define a pattern whereby the pattern specifies a set of strings. To specify such sets of strings, rules may provide a more concise way to express the set of stings than simply providing an exhaustive list of a set's members. The formal notation or syntax of a regular expression may be any suitable syntax although examples are provided herein such as regarding the operators that may be used in forming regular expressions. As an example, regular expressions may include the following operations. A vertical bar may be used to separate alternatives. For example A|B denotes that A or B can match. Parentheses may be used to define the scope and precedence of operators. A quantifier may be follow a token (such as character) or group to specify how often the preceding element is allowed to occur. Examples of quantifiers may include: the question mark (?) indicating that there is zero or one of the preceding element (e.g., A?B matches "AB" and "B"), the asterisk (*) indicating that there is zero or more of the preceding element (e.g., A*B matches "B", "AB", "AAB" and "AAAB", and so on for N occurrences of A, N>0 or N=0), and the plus sign (+) indicating that there is one or more of the preceding element (e.g., A+B matches "AB", "AAB" and "AAAB" and so on for N occurrences of A, N>0). These constructions can be combined to form arbitrarily complex expressions, much like one can construct arithmetical expressions from numbers and the mathematical operations +, −, ×, and ÷. A range of integers or characters may be included with square brackets such as [2-9] denoting that a single element in the expression may be an integer in the range of 2-9, inclusively. Different shorthands may also be used to denote an integer or character. For example \d may denote an integer in the range 0-9, inclusively. As a more complex example, a valid IP (internet protocol) address may be of the form [0-255].[0-255].[0.255].[0.255] (e.g., four integers each in the inclusive range of 0 . . . 255, each consecutive pair of integers being separated by a period "."). Another way in which a regular expression may be specified for a valid IP address using text may be as in connection with rule 93:

"/^0*([1-9]?\d|1\d\d|2[0-4]\d|25[0-5])\.0*([1-9]?\d|1\d\d|2[0-4]\d|25[0-5])\.0*([1-9]?\d|1\d\d|2[0-4]\d|25[0-5])\.0*([1-9]?\d|1\d\d|2[0-4]\d|25[0-5])$/"

where:
[1-9]?\d represents values from 1-99;
1\d\d represents values from 100-199;
2[0-4]\d represents value from 200-249; and
25[0-5] represents values from 250-255.

Regular expressions may be one way in which valid or invalid expressions may be specified in a validation rule. The precise syntax for regular expressions may vary with embodiment. Thus, rule 93 specifies criteria for determining with an input represents a valid IP address.

With reference back to FIG. 2A, one or more user inputs may be obtained such as using GUI 52a and validation processing may be performed with respect to the inputs by invoking the engine 52b. In this invocation of the rules engine 52b, one or more validation rules may be denoted in order to identify to the engine 52b which validation rules and associated criteria are to be utilized with evaluating the input. For example, a user may submit a form using GUI 52a that is used to input a name of a person. The name is expected to be a string or text denoting character input such as specified in rule 91 of FIG. 2C. Additionally, a valid name is not expected to include certain characters such as specified in rule 93 of FIG. 2C. In connection with processing performed by client A 52 with validating input "name", a call is made to the validation engine 52b to perform the method "validate" such as:

validationEngine.validate([text64, nameRestrictedCharacters], name).

In this example, inputs to the validation engine may include a list of one or more validation rules (e.g., text64, nameRestrictedCharacters) and one or more inputs for which validation is performed (e.g. input in this example is a single input of "name"). The foregoing may return true if the length of name is within the limits of the nameLength validation rule 91 and name did not contain any of the characters specified in the nameRestrictedCharacters validation rule 92. Such validation processing may be performed, for example, as the user input is entered and/or submitted using the GUI.

The foregoing are only examples illustrating ways in which validation rules, catalogues, and the like, may be specified and used in an embodiment in accordance with techniques herein.

Figure 3:
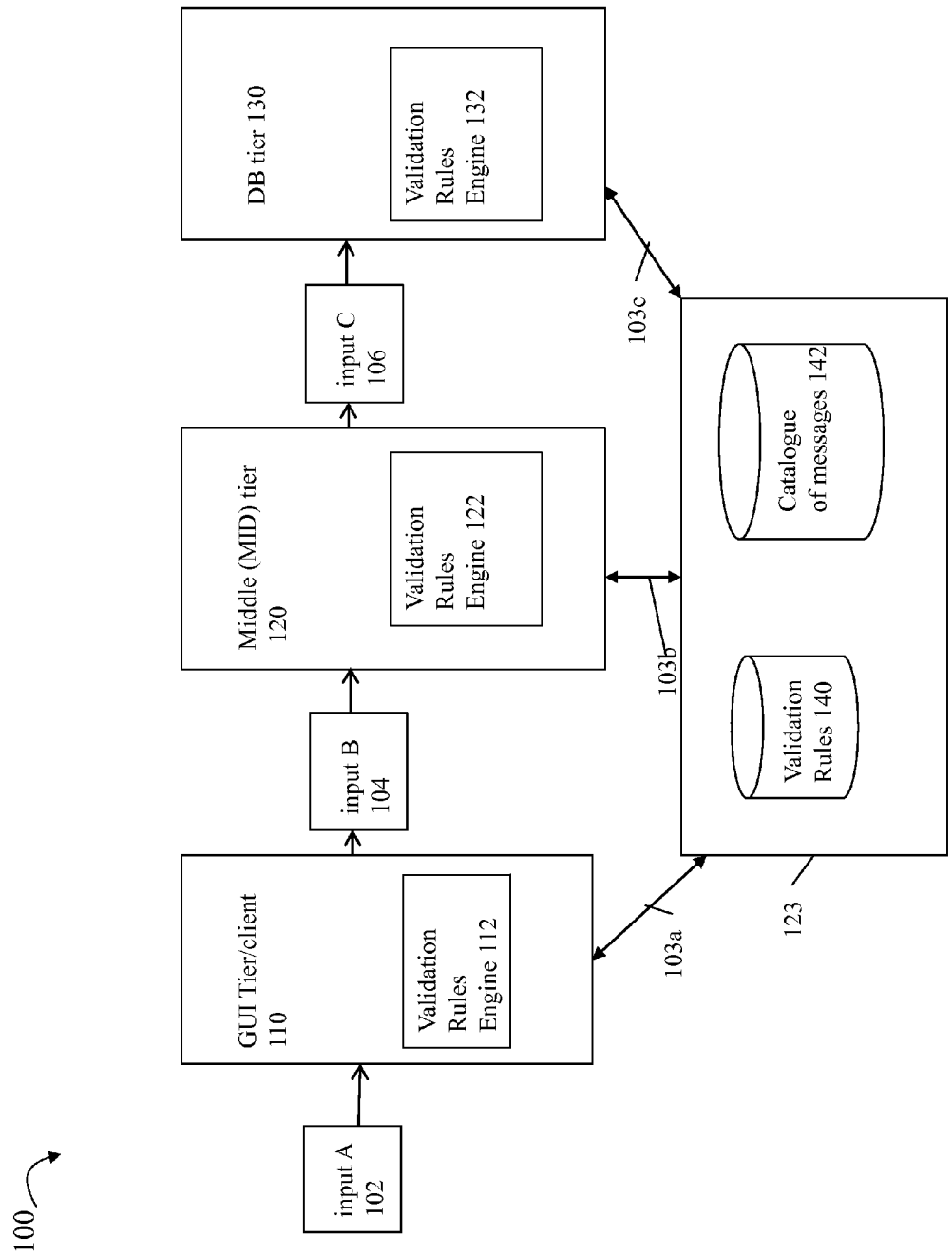

As another example, reference is made to FIG. 3. The example 100 of FIG. 3 may be characterized as including three tiers or levels in which input validation processing may be performed. The example 100 includes a first tier that may be a GUI client, a second or middle (MID) level tier 120, and a third level tier that is a database (DB) tier 130. Each of the tiers 110, 120, and 130 respectively include a validation rules engine 112, 122, and 132 which may operate and be used in a manner as described above in connection with performing data validation. Element 123 may include the validation rules 140 and one or more catalogues of messages 142 used by the engines 112, 122 and 132. The 3 tiers or levels correspond to tiers of different modules or components that may be invoked at runtime. Input A 102 may be obtained using GUI 110. Input A 102 may be validated by engine 112 in accordance with one or more validation rules 140. If input A is valid, input A may be transformed into input B 104 having a format and form acceptable for processing by the MID tier 120. Input B 104 may be validated by engine 122 in accordance with one or more validation rules 140. If input B is valid, input B may be transformed into input C 106 having a format and form acceptable for processing by the DB tier 130. Input C 106 may be validated by engine 132 in accordance with one or more validation rules 140. If input C is valid, input C may be processed, such as stored in a DB of the DB tier 130.

In connection with the example 100, the multiple tiers 110, 120, 130 may want to perform the same or different data validation processing (e.g., using the same or different validation rules from 140). The GUI 110 may want to perform validation in order to provide the user with quick feedback regarding the validity/invalidity of input 102 entered rather than have the user wait to receive error messages regarding the invalidity of input performed at a later processing point, such as by the MID 120 or DB level tier 130. The GUI 110 may be a client which may perform calls to one or more different servers (e.g., such as 120 and/or 130) depending on the operation being performed or requested through the GUI. It may be desirable to perform validation of user input by the GUI, or more generally the client, prior to performing calls to any server. Reasons why it may be desirable to have the GUI or client perform such validation processing of user input may include, for example, to provide the user with feedback regarding any invalid input as soon as possible, to reduce the communication and traffic to the servers since if the input is invalid, the call to the server with such invalid input is unnecessary, and possibly others depending on the particular embodiment.

In one embodiment, the GUI 110 may be written in Flex and use a Flex validation engine 112, the MID tier 120 may be written in Java and use a Java validation engine 122, and the DB tier 130 may be an SQL database using an engine 132 written in any suitable language for communicating with other code of the DB tier 130 for data validation.

Each tier 110, 120, 130 may not be able to make an assumption regarding any particular data validation having been performed by another tier since each tier may be used alone, or in combination with one or more other tiers. Additionally, although each tier may use the same set of rules 140, each tier may use the same or different ones of the rules 140 in connection with validating the user input which is communicated to the different tiers in possible different forms. As an example, user input 102 may be entered such as through a form, menu, and the like, of the GUI 110. The GUI 110 may perform a field by field validation of user input using a first portion of the rules. The GUI 102 may then transform input A 102 to input B 104 and send input B 104 to the MID tier 120, such as using APIs exposing functionality of the MID tier. The MID tier 120 may perform validation of input B 104 received from the GUI using a second portion of the rules. The input B communicated from the GUI to the MID tier may have a second form or format based on the particular APIs of the MID tier. In turn, the MID tier 120 may then transform input B 104 to input C 106 and transmit input C 106 to the DB tier 130 such as using APIs particular to the DB tier exposing functionality of the DB tier. The DB tier 130 may perform validation of input C 106 received from the MID tier using a third portion of the rules. The input C 106 sent from the MID tier to the DB tier may have a third form or format based on the particular APIs of the MID tier. To further illustrate, a first user input may be received by the GUI where the user input has a type integer. The MID tier may have a defined API which includes only string or text type inputs. Thus, the GUI may convert the first user input from integer to text or string type input when sending the user input to the MID tier using the MID tier's defined APIs. In this manner, the GUI and the MID tier may use different rules in the same set of rules for validating received input. Alternatively, the multiple tiers may also use the same rules of the same set for data validation.

To further illustrate how the different tiers may use different ones of the same set of rules, consider a use where the GUI 110 is a GUI of data storage management software. In connection with such management software, a user may be a data storage administrator that performs operations and tasks in connection with data storage management and configuration. For example, the user may use the management software to provision storage for an application, configure RAID groups of physical devices, define a logical entity such as a storage group including a set of LUNs, view information regarding the existing data storage system configuration, and the like. For example, the user may use the GUI to configure a RAID group having a particular RAID level or RAID configuration. Different RAID levels are known in the art such as, for example RAID-0 (e.g., block level striping without parity or mirroring thereby providing no redundancy), RAID-1 (e.g., mirroring without parity or striping whereby data is written identically to two drives providing a mirrored set), RAID-5 (e.g., block level striping with distributed parity), RAID-6, (e.g., block-level striping with double distributed parity), and the like. Thus, a RAID group may include one or more physical device or drive (PD) members depending on the RAID-level. Additionally, the number of PDs which may be considered valid may vary with the particular RAID level specified.

Figure 4:
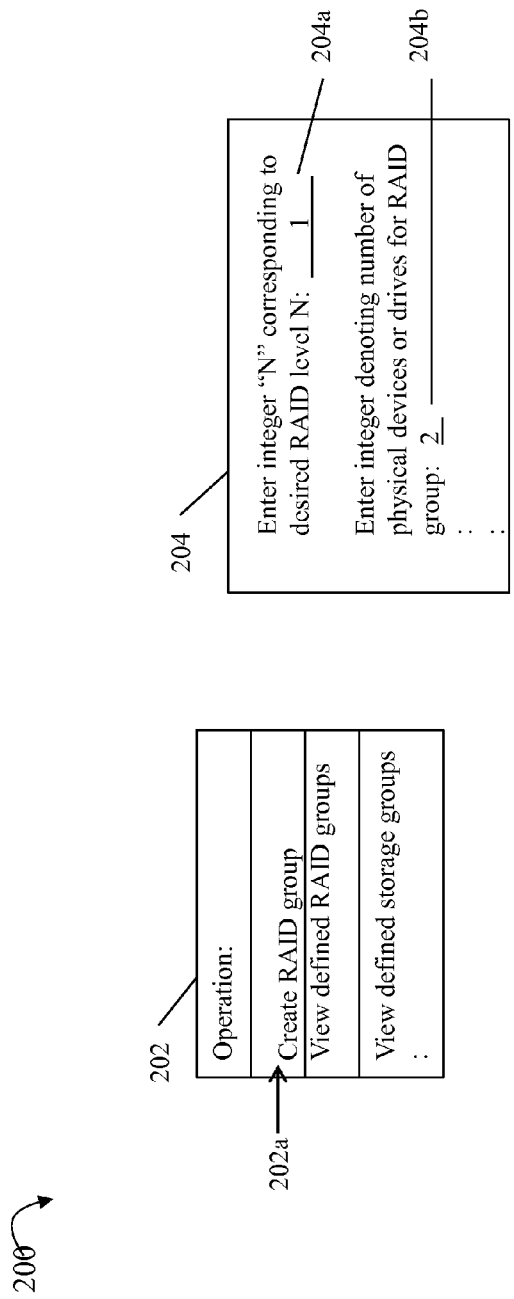
FIG. 4 is an example of information that may be displayed in connection with a user interface in an embodiment in accordance with techniques herein.

Referring to FIG. 4, shown is an example of information that may be displayed in connection with UI elements of the GUI 110 in accordance with techniques herein. The example 200 includes a first menu 202 from which a user may select an operation or command to be performed. The user may select element 202a to create a RAID group. Subsequently, response to selecting 202a, the user may be presented with a screenshot 204 of the GUI prompting the user to enter different inputs. For example, the user may enter input an integer 204a denoting the desired RAID level. For example, the user enters an integer N denoting the RAID level N. The user may enter integer 204b denoting the number of physical devices or drives (PDs) used for the RAID group configuration. Validation processing performed by the GUI 110 may include, for example, ensuring that input 204a is an integer and that the integer is one of a defined set of valid integers denoting valid or allowable supported RAID levels. For example, valid inputs for 204a may include 0, 1, 5 and 6 using a validation RULE A. In accordance with rules expressed in XML as illustrated in FIG. 2C, RULE A may be:
   validation id "RAID_LEVEL_INT" type="integer"
   catalogID="INVALID_RAID_LEVEL_INT" validIntList=0, 1, 5, 6

In RULE A, validIntList may be used to identify the list of valid integer values for N denoting a valid supported RAID level N (e.g., supported RAID levels are RAID-0, RAID-1, RAID-5 and RAID-6).

Validation processing performed for input 204b may include ensuring that 204b is an integer and that 204b denotes an integer value that is valid for the entered RAID level denoted by 204a. For example, for RAID-1, 2 may be the only valid input in one embodiment for input 204b. In accordance with rules expressed in XML as illustrated in FIG. 2C, RULE B may be:
   validation id "RAID1_NUMPDs" type="integer"
   catalogID="INVALID_NUM_PDS_RAID_1" validIntList=2

Figure 5:
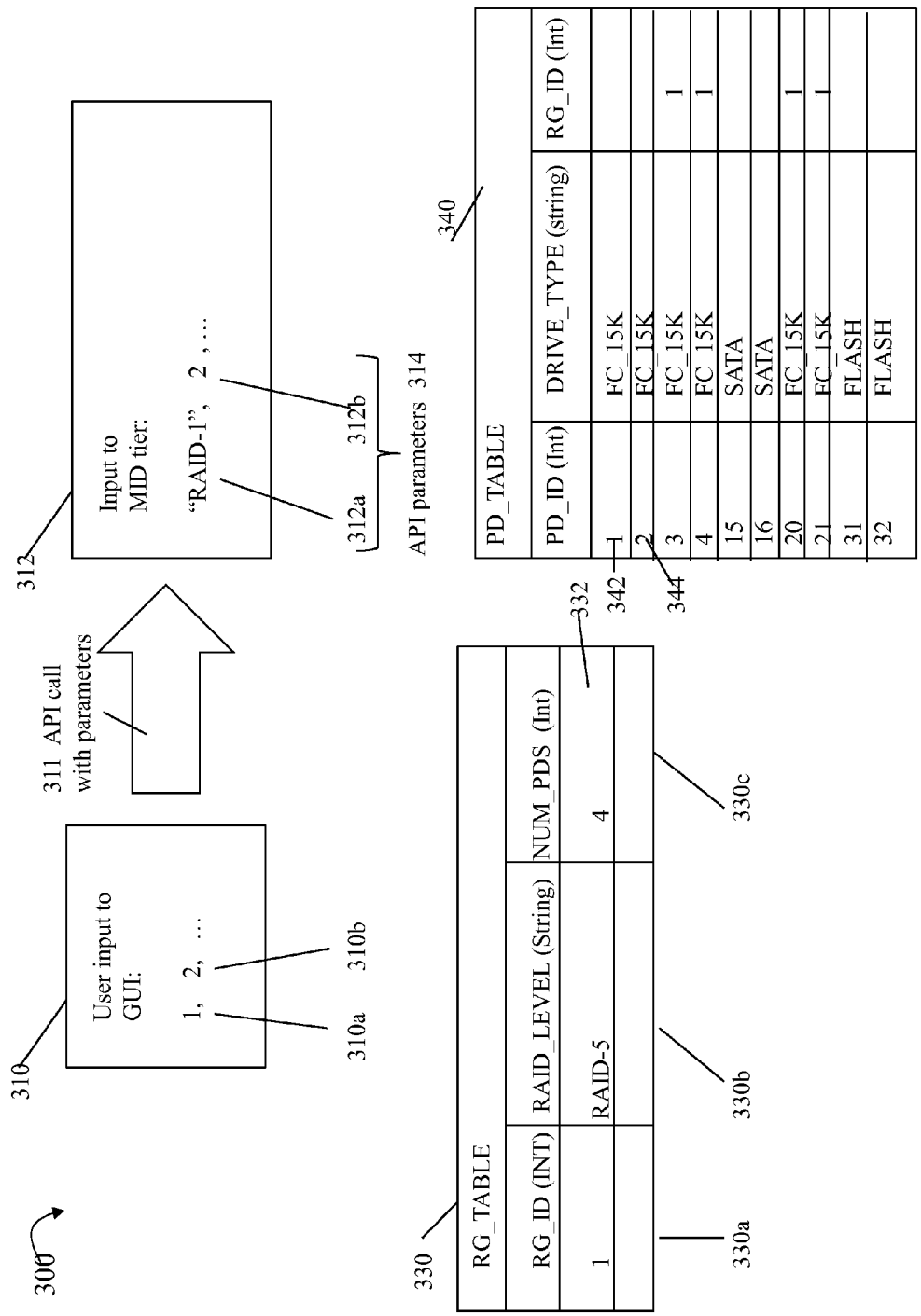
FIGS. 5 and 6 are examples illustrating information, calls, parameters, and commands that may be used by different components in an embodiment in accordance with techniques herein.

Referring to FIG. 5, the element 310 denotes a list of inputs obtained using the GUI as illustrated in FIG. 4 for the selected operation to create a new RAID group. In particular, elements 310a, 310b of FIG. 5 correspond, respectively, to inputs 204a, 204b of FIG. 4. The user inputs 310 may be communicated to the MID level tier in an API call 311 having parameters based on the defined API call corresponding to the operation to create a new RAID group. The following is an example of a defined API call made by the GUI 110 to the MID tier 120 using the parameters of 312.
   Create_RG (RAID_level type String /* string or text that is any of "RAID-0", "RAID-1", "RAID-5" or "RAID-6" denoting a supported RAID level */
     NUM_PDs Integer /* integer denoting number of PDs in RAID group */ . . . )

Element 312 may denote the parameters input to the MID tier from the GUI via the API call 311. The first input 312a to the MID tier as a parameter of the API call is a string "RAID-1" denoting the RAID-level or type (corresponding to 310a). The second input 312b to the MID tier as a parameter of the API call is an integer denoting the number of PDs (corresponding to 310b). The MID tier may perform validation of the RAID level denoted by parameter 312a using a validation RULE C (rather than using RULE A as by the GUI for validation). In accordance with the XML format for rules as described above and in connection with FIG. 2C, RULE C may be"
   validation id "RAID_LEVEL_STRING" type="text"
   catalogID="INVALID_RAID_LEVEL_STRING
   regex="RAID-(0|1|5|6)"
where regex is a regular expression denoting that the acceptable strings for allowable RAID levels include "RAID-0", "RAID-1", "RAID-5", and "RAID-6".

The MID tier may perform validation of the number of PDs for the RAID group using RULE B as described above which is also used by the GUI for input validation.

In this example, the GUI may allow the user to select the RAID level or type and the number of PDs in the RAID group being configured as noted above and in FIG. 4. However, the selection of the particular PDs for the RAID group such as based on one or more properties of the PDs (e.g., such as PDs of a particular technology, capacity, and the like) may be performed by code of the MID tier. In other words, the selection of the particular PDs for the new RAID group may not be exposed to the user for selection through the GUI. Rather, this particular embodiment described herein may have the MID tier perform such selection such as, for example, based on configuration defaults, best practices, and the like.

Elements 330 and 340 may represent tables included in the Database of the Database (DB) tier 130. The DB of the DB tier may be an SQL database and data may be read from and/or written to the DB and its tables 330, 340 by issuing SQL statements. Table 330 may be a table RG_TABLE of currently defined RAID groups. The table 330 may include a first column 330a RG_ID of type integer denoting a unique primary key of the table 330 used to uniquely identify each defined RAID group entry in the table 330. Each RAID group currently defined may have a unique corresponding row in the RG_TABLE 330 as denoted by a unique value in 330a. The table 330 may also include a second column 330b of type string or text denoting the RAID level. In this example, valid values for a RAID level in column 330b include "RAID-0", "RAID-1", "RAID-5" and "RAID-6" as described elsewhere herein. The table 330 may also include a third column NUM_PDS of type integer denoting the number of PDs in the RAID group. Each defined RAID group instance in table 330 may include properties of a row of table 330. In this example, there is a single defined RAID group denoted by row 332 for a RAID group having a RG_ID of 1 with a RAID-5 configuration of 4 PDs.

The table 340 PD_TABLE may be a table of PDs in the data storage system. The table 340 may include a first column 340a PD_ID of type integer denoting a unique primary key of the table 340 used to uniquely identify each defined PD in the table 340. Each PD currently defined may have a unique corresponding row in the PD_TABLE 340 as denoted by a unique value in 340a. The table 340 may also include a second column 340b of type string or text denoting the DRIVE_TYPE. In this example, valid values for column 340b include "FC_15K" denoting a Fibre Channel (FC) 15 RPM rotating disk drive, "FC_10K" denoting an FC 10K RM rotating disk drive, "SATA" denoting a SATA rotating disk drive, and "FLASH" denoting a solid state or flash-based drive. The table 340 may also include a third column RG_ID of type integer denoting the RAID group in which the PD associated with the table row is included (e.g., the PD identified by the row in the table 340 is included in the RAID group identified by the RG_ID of column 340c. Each PD instance in table 340 may include properties of a row of table 340. In this example, there are 10 PDs which PDs 3, 4, 20 and 21 included in RG_ID=1, as represented by row 332 of table 330. It should be noted that a PD having a row in table 340 may or may not have a value specified in column 340c depending on whether that PD is currently configured in a RAID group. Thus, the PDs having no value in column 340c may denote PDs which are available for configuration in a RAID group. A PD of table 340 having a value in column 340c may identify a row in the RG_TABLE 330 for the RG in which the PD is included.

Code of the MID tier may use other defined APIs issue SQL queries to the DB tier 130 to read information from the PD_Table 340 and RG_TABLE 330 as needed. In this example, the MID tier may perform processing to determine which PDs of table 340 are currently available for use in configuring the new RAID group, to determine which available PDs to select such as based on properties including DRIVE_TYPE, and the like. Continuing with this example, the MID tier may select two PDs from PD_TABLE 340 for the new RAID group being created. In this example, the MID tier may select PD_ID=1 and PD_ID=2 for the RAID group being created. Additionally, the MID tier may select a value for RG_ID identifying the new RAID group so as to not select a value for a currently defined RAID group. The MID tier code may select an integer value for RG_ID other than 1 which is the value of RG_ID for the single existing RAID group denoted by 332. In this example, the MID tier may select a value for RG_ID=5 for the RAID group being created.

Figure 6:
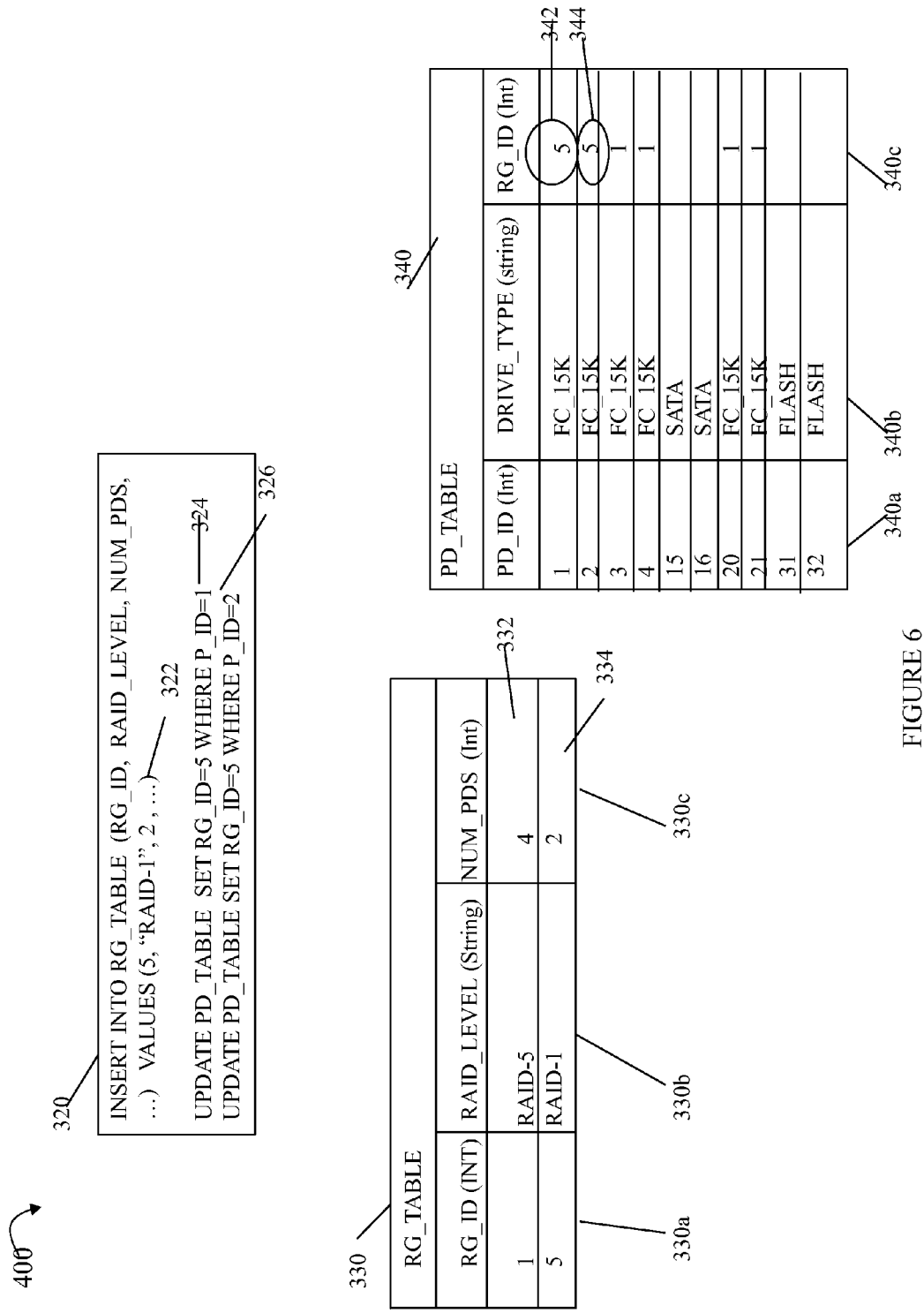

The MID tier may issue calls to the DB tier to create the new RAID group. In this example with reference to FIG. 6, the MID tier may issue SQL statements 320 to the DB tier to create the new RAID group. Element 322 is a first SQL statement, an INSERT statement, to create a new row in the RG_TABLE 330 for the new RAID group. The INSERT SQL statement may have a general form of:

INSERT INTO table_name (column1, column2, column3, ... )
VALUES (value1, value2, value3, ... )
where
table_name denotes the table into which a new row is inserted;
column1, column2, ... denote column names in the table; and
value1, value2, ... denote values placed in corresponding columns of the table for the inserted row. The values may positionally correspond to the named columns so that value1 is assigned to column1, value2 is assigned to column2, and so on.

The SQL statement of 322 results in inserting row 334 into table 330 for the newly created RAID group.

The MID tier may also issue SQL statements 324 and 326 to update existing rows of table 340. The SQL UPDATE statements 324, 326 may have a general format of:

UPDATE table_name
SET column1=value, column2=value2, ...
WHERE some_column=some_value
where
table_name of the UPDATE clause denotes the table having a row updated;
column1, column2, ... of the SET clause denote column names in the table being updated and column1=value1 denotes that column 1 is assigned value 1, column2=value2 denotes that column 2 is assigned value2 and so on; and
some_column=some_value of the WHERE clause identifies the particular row of the table that is updated with the values in the SET clause.

In this example, statements 324, 326 update two rows of the table 340 so that column 340c RG_ID is set to 5 to represent the binding of the two PDs (e.g., for the two PDs having PD_ID=1 and 2) to the RAID group denoted by entry 334.

The DB tier 130 may perform validation of the inputs such as specified as parameter values for the SQL query statements of 320. For example, for validation of the parameter values of 5, "RAID-1" and 2 of statement 322, validation RULES D, C and B may be respectively used. RULES B and C may be as described above. RULE D, expressed using XML, may be:

validation id "INT_ID" type="integer" catalogID="INVALID_INTEGER"

For validation of the parameter values of 5 and 1, respectively, in each of 324 and 326, RULE D may be used. In this manner, the DB tier may perform validation processing prior to storing data in the DB tables.

With reference back to FIG. 3, although 3 tiers are illustrated for exemplary purposes, it should be noted that techniques herein may be generally used in connection with any number of tiers or levels.

As a variation to the foregoing, user input may also be communicated directly to the MID tier 120 without using the GUI tier 102, for example, if the user input is specified through some other suitable means or technique known in the art, such as a CLI, script, other software component, and the like. Thus, although the GUI performs input validation prior to issuing the request to the MID tier 120 as noted above, the MID tier 120 may be invoked by other software which may not perform user input validation (e.g., input validation may not be performed by the CLI, script, or other software component, sending the user input to the MID tier so that there is no user input validation prior to sending the user input to the MID tier).

The MID tier 120 may use the DB 130 for only certain operations or requests from the GUI 110. As a further variation, the MID tier 120 may use multiple DBs having different DB interfaces depending on the particular operation performed. More generally, there may also be multiple MID tiers and/or multiple GUIs along with multiple DB tiers. In such embodiments, any tier may generally make calls to any other tier as may be needed.

Figure 7:
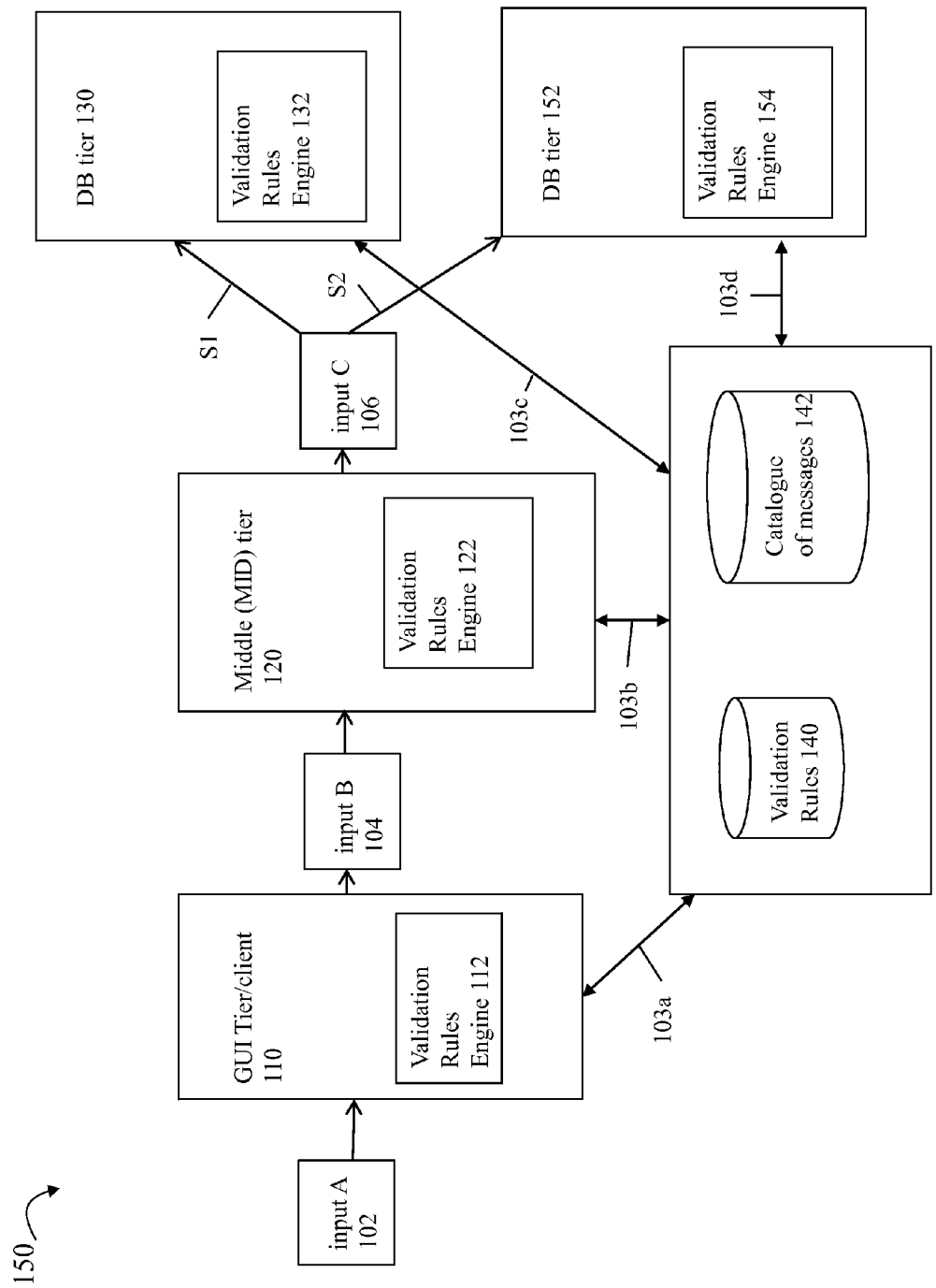

With reference to FIG. 7, shown is an example 150 illustrating a variation of the embodiment described in connection with FIG. 3. The elements in the example 150 of FIG. 7 are the same as in connection with FIG. 3 with the addition of a second DB tier 152 having its validation rules engine 154. As described above, the MID tier 120 may communicate with multiple different DBs 130, 152 depending on the particular operations, information stored in the different DBs 130, 152, and the like. The DB tier 152 and its engine 154 may also use the validation rules 140 and catalogue 142 for input data validation in a manner similar to that as described above in connection with other tiers 110, 120, 130, and their respective engines 112, 122 and 132.

It should be noted that the validation rules as described herein may generally be used in connection with performing any required input validation. For example, as described herein, one or more validation rules may be used in connection with ensuring that an input is a valid IP address, ensuring that a number of physical devices specified is allowable for a particular selected RAID type, ensuring that a string input has a length in a defined range, ensuring that a string input does not include a restricted character, ensuring that numeric fields do not include non-numeric characters, ensuring that required fields have a value, and the like.

Figure 8:
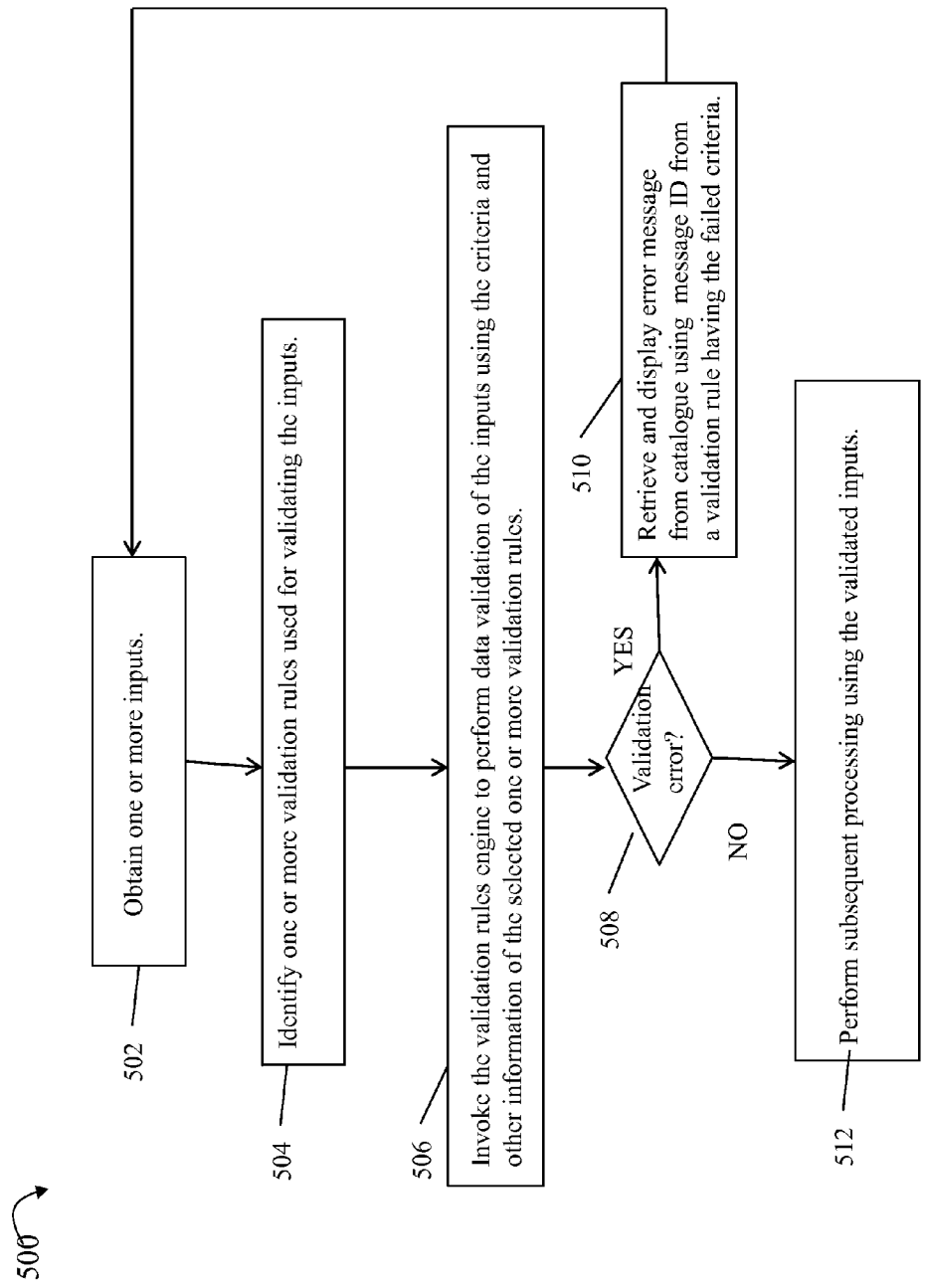
FIG. 8 is a flowchart of processing steps that may be performed in an embodiment in accordance with techniques herein.

Referring to FIG. 8, shown is a flowchart of processing steps that may be performed in an embodiment in connection with techniques herein. The steps of the flowchart 500 summarize processing as described above and may be performed by each of the entities, such as tiers, modules, or component, in connection with performing validation of inputs received prior to performing other processing using the inputs. For example, the steps of 500 may be performed by a client, a server, each of the tiers described herein, and the like, by a validation engine using the same validation rules and catalogue(s) as other entities for data validation. At step 502, one or more inputs may be received. At step 504, one or more validation rules may be identified or selected for use validating the inputs from step 502. In step 506, a validation rules engine may be invoked to perform data validation of the inputs using the criteria and other information of the identified one or more validation rules. At step 508, a determination is made as to whether there has been an input validation error whereby it is determined whether the inputs meet the validation criteria of the validation rules. If the inputs do not meet the criteria then there has been a validation error and step 508 evaluates to yes. Control then proceeds to step 510 where an error message (as identified by the rule having the failed validation criteria) may be retrieved from the catalogue and displayed. From step 510, control may proceed to step 502 to obtain corrected input values. If step 508 evaluates to no indicated that the inputs are valid, control proceeds to step 512 to perform any subsequent processing using the validated inputs. With reference back to FIG. 3, if the steps of 500 are performed by the GUI 110, step 512 may include, for example, issuing an API call to the MID tier 120 to perform an operation. The API call may be a request to perform the operation and may include the validated inputs transformed to a second format in accordance with the API call.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing inputs comprising:
providing a plurality of rules engines, wherein each of the plurality of rules engines is written in a different programming language;
performing input validation processing of a first set of one or more inputs by a first of the plurality of rules engines using a first portion of validation rules, wherein said first set of one or more inputs are user inputs obtained from a user interface and in connection with provisioning storage for a logical entity in a data storage system, wherein each of the validation rules includes a message identifier associated with an error message, and each of the validation rules includes validation criteria comprising required validation criteria and optionally comprising optional validation criteria, wherein a specified input needs to meet the required criteria and additionally needs to meet the optional validation criteria, if specified, to be successfully validated in accordance with said each validation rule, wherein said optional validation criteria of at least one of the validation rules includes any of: a minimum length of an input, a maximum length of an input, and an expression denoting an acceptable pattern or format of an input, wherein a plurality of message catalogues include text of a same set of error messages for a plurality of spoken languages, the plurality of message catalogues each using a same set of message identifiers whereby a same one of the message identifiers in each of the plurality of message catalogues is associated with text of a same error message in a different one of the plurality of spoken languages; and
responsive to the input validation processing by the first rules engine determining that the first set of one or more inputs is valid, performing processing including:
transforming at least one of the first set of one or more inputs and producing a second set of one or more inputs as a result of said transforming; and
performing input validation processing of the second set of one or more inputs by a second of the plurality of rules engines using the second portion of the validation rules.

2. The method of claim 1, wherein the second portion of the validation rules and the first portion of the validation rules each include at least one same rule from the validation rules.

3. The method of claim 1, wherein each of the validation rules is uniquely identified by a rule identifier and said each validation rule identifies the message identifier associated with an error message included in the plurality of message catalogues.

4. The method of claim 3, wherein the error message is displayed responsive to one of the plurality of rules engines determining, for an input, that said validation criteria of said each rule is not met by said input.

5. The method of claim 3, wherein said message identifier is an index into each of the plurality of message catalogues and a record of each of the plurality of message catalogues includes the error message, the record being identified by the index.

6. The method of claim 5, wherein one of the plurality of message catalogues is selected for use in accordance with a language setting.

7. The method of claim 1, wherein the first rules engine performs input validation processing for a selected input at runtime during execution of a first code module, and the first code module issues a request to said first rules engine to perform input validation processing for the selected input.

8. The method of claim 7, wherein, upon successful validation of the selected input, the first code module transforms the selected input into a second input and issues a request to a second code module in accordance with an application programming interface defined for invoking the second code module, the application programming interface including one or more parameters whereby said second input is specified as a value for a first of the one or more parameters.

9. The method of claim 8, wherein said second code module performs input validation processing of the second input using another one of the plurality of rules engines.

10. The method of claim 1, wherein input validation processing of the first set of one or more inputs uses a first validation rule of the validation rules, the first validation rule including first required criteria as the required criteria of the first validation rule and first optional criteria as the optional validation criteria of the first validation rule, and wherein the first set of one or more inputs is determined as valid if each input in the first set meets the first required criteria and the first optional criteria.

11. The method of claim 1, wherein said first portion of the validation rules is used to perform said input validation processing including ensuring that an input is a valid IP (internet protocol) address, and wherein the first portion includes said at least one validation rule with said optional validation criteria comprising the expression, and wherein the expression denotes the acceptable pattern or format of the valid IP address.

12. The method of claim 1, wherein said first portion of the validation rules is used to perform said input validation processing including ensuring that a number of physical devices specified is allowable for a particular selected RAID type.

13. The method of claim 1, wherein said first portion of validation rules is used to perform said input validation processing including ensuring that a string input has a length in a defined range.

14. A non-transitory computer readable medium comprising code stored thereon that, when executed, performs a method for processing inputs comprising:
providing a plurality of rules engines, wherein each of the plurality of rules engines is written in a different programming language;
performing input validation processing of a first set of one or more inputs by a first of the plurality of rules engines using a first portion of validation rules, wherein said first set of one or more inputs are user inputs obtained from a user interface and in connection with provisioning storage for a logical entity in a data storage system, wherein each of the validation rules includes a message identifier associated with an error message, and each of the validation rules includes validation criteria comprising required validation criteria and optionally comprising optional validation criteria, wherein a specified input needs to meet the required criteria and additionally needs to meet the optional validation criteria, if specified, to be successfully validated in accordance with said each validation rule, wherein said optional validation criteria of at least one of the validation rules includes any of: a minimum length of an input, a maximum length of an input, and an expression denoting an acceptable pattern or format of an input, wherein a plurality of message catalogues include text of a same set of error messages for a plurality of spoken languages, the plurality of message catalogues each using a same set of message identifiers whereby a same one of the message identifiers in each of the plurality of message catalogues is associated with text of a same error message in a different one of the plurality of spoken languages; and
responsive to the input validation processing by the first rules engine determining that the first set of one or more inputs is valid, performing processing including:
transforming at least one of the first set of one or more inputs and producing a second set of one or more inputs as a result of said transforming; and
performing input validation processing of the second set of one or more inputs by a second of the plurality of rules engines using the second portion of the validation rules.

15. The non-transitory computer readable medium of claim 14, wherein the second portion of the validation rules and the first portion of the validation rules each include at least one same rule from the set of validation rules.

16. The non-transitory computer readable medium of claim 14, wherein each of the validation rules is uniquely identified by a rule identifier and said each validation rules identifies the message identifier associated with an error message included in the plurality of message catalogues.

17. The non-transitory computer readable medium of claim 16, wherein the error message is displayed responsive to one of the plurality of rules engines determining, for an input, that said validation criteria of said each rule is not met by said input.

18. A system comprising:
a first set of one or more clients each including one or more processors, wherein each client in said first set executes code of one of a plurality of rules engines using a processor to perform input validation of first inputs received at said each client, wherein each of the plurality of rules engines is written in a different programming language and performs input validation processing using validation rules used by every other one of the plurality of rules engines; and
a second set of one or more servers each including one or more processors, wherein each server in said second set executes code of one of the plurality of rules engines using a processor to perform input validation of second inputs received at said each server, wherein each of the plurality of rules engines uses a plurality of message catalogues from which a message is obtained in response to determining an input is invalid, each of the plurality of message catalogues including message text in a different language or language dialect, and wherein each of the validation rules includes a message identifier associated with an error message, and each of the validation rules includes validation criteria used to determine whether an input is valid, the validation criteria including required validation criteria and optionally including optional validation criteria, wherein a specified input needs to meet the required criteria of said each validation rule and additionally needs to meet the optional validation criteria of said each validation rule, if specified, to be successfully validated in accordance with said each validation rule, wherein said optional validation criteria of at least one of the validation rules includes any of: a minimum length of an input, a maximum length of an input, and an expression denoting an acceptable pattern or format of an input, wherein the plurality of message catalogues include text of a same set of error messages for a plurality of spoken languages, the plurality of message catalogues each using a same set of message identifiers whereby a same one of the message identifiers in each of the plurality of message catalogues is associated with text of a same error message in a different one of the plurality of spoken languages; and wherein the first inputs received at said each client are user inputs obtained from a user interface and in connection with provisioning storage for a logical entity in a data storage system and said each client includes a memory comprising code stored thereon that performs a method comprising:

responsive to the input validation of the first inputs received at said each client determining that the first inputs received at said each client are valid, performing processing including:

transforming at least one of the first inputs received at said each client and producing at least one of the second inputs sent by said each client to a server in the second set of one or more servers;

sending the second inputs from said each client to the server; and performing input validation processing of the second inputs by the server.

* * * * *